United States Patent
Shi et al.

(10) Patent No.: US 10,812,969 B2
(45) Date of Patent: Oct. 20, 2020

(54) SYSTEM AND METHOD FOR CONFIGURING A WIRELESS DEVICE FOR WIRELESS NETWORK ACCESS

(71) Applicant: Huawei International Pte. Ltd., Singapore (SG)

(72) Inventors: Jie Shi, Singapore (SG); Chengfang Fang, Singapore (SG); Guilin Wang, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

(21) Appl. No.: 16/403,110

(22) Filed: May 3, 2019

(65) Prior Publication Data
US 2019/0261168 A1   Aug. 22, 2019

Related U.S. Application Data

(63) Continuation of application No. PCT/SG2017/050357, filed on Jul. 18, 2017.

(30) Foreign Application Priority Data

Nov. 4, 2016 (SG) .............................. 10201609247Y (51) Int. Cl.
*H04W 12/04* (2009.01)
*H04W 12/00* (2009.01)
(Continued)

(52) U.S. Cl.
CPC ....... *H04W 12/0013* (2019.01); *H04L 9/0841* (2013.01); *H04L 9/0844* (2013.01);
(Continued)

(58) Field of Classification Search
CPC .............. H04W 12/0013; H04W 4/50; H04W 12/0401; H04W 12/04071;
(Continued)

(56) References Cited

U.S. PATENT DOCUMENTS 6,226,383 B1 * 5/2001 Jablon .................. H04L 9/0844
                                                                 380/30
8,813,198 B2   8/2014 Louboutin et al.
(Continued)

FOREIGN PATENT DOCUMENTS

CN       103379477 A     10/2013
CN       104378801 A     2/2015
(Continued)

OTHER PUBLICATIONS

"Elliptic-curve Diffie—Hellman,"Wikipedia, Retrieved from the Internet: https://en.wikipedia.org/wiki/Elliptic-curve_Diffie%E2%80%93Hellman (Jun. 20, 2019).
(Continued)

*Primary Examiner* — Joseph P Hirl
*Assistant Examiner* — Stephen T Gundry
(74) *Attorney, Agent, or Firm* — Leydig, Voit & Mayer, Ltd.

(57) ABSTRACT

This document describes a system and method for configuring a second wireless device to access a wireless network using a first wireless device whereby one-round key exchange protocol is adopted to share the wireless network's configuration data with the second wireless device in an efficient and secure manner.

15 Claims, 6 Drawing Sheets

(51) Int. Cl.
*H04L 9/08* (2006.01)
*H04L 9/14* (2006.01)
*H04L 9/32* (2006.01)
*H04W 12/08* (2009.01)
*H04W 4/50* (2018.01)
*H04L 29/06* (2006.01)

(52) U.S. Cl.
CPC .............. *H04L 9/14* (2013.01); *H04L 9/3213* (2013.01); *H04L 9/3242* (2013.01); *H04L 63/0435* (2013.01); *H04W 4/50* (2018.02); *H04W 12/0023* (2019.01); *H04W 12/0401* (2019.01); *H04W 12/04071* (2019.01); *H04W 12/08* (2013.01); *H04L 2209/80* (2013.01)

(58) Field of Classification Search
CPC .............. H04W 12/0023; H04W 12/08; H04L 9/0841; H04L 9/0844; H04L 9/14; H04L 9/3213; H04L 9/3242; H04L 63/0435; H04L 2209/80
See application file for complete search history.

(56) References Cited

U.S. PATENT DOCUMENTS

| | | | |
|---|---|---|---|
| 10,129,223 B1* | 11/2018 | Bhattacharyya | H04L 63/061 |
| 2002/0067832 A1* | 6/2002 | Jablon | H04L 9/0844 380/277 |
| 2004/0083368 A1* | 4/2004 | Gehrmann | H04L 9/0841 713/171 |
| 2004/0223619 A1* | 11/2004 | Jablon | H04L 9/0844 380/277 |
| 2007/0288753 A1 | 12/2007 | Gehrmann | |
| 2011/0158411 A1 | 6/2011 | Medvinsky et al. | |
| 2013/0103939 A1* | 4/2013 | Radpour | H04W 12/04 713/152 |
| 2014/0215594 A1 | 7/2014 | Lambert | |
| 2014/0258724 A1* | 9/2014 | Lambert | H04L 63/0442 713/170 |
| 2014/0366105 A1 | 12/2014 | Bradley et al. | |
| 2015/0095648 A1* | 4/2015 | Nix | H04J 11/00 713/170 |
| 2016/0021066 A1* | 1/2016 | Parvathaneni | H04W 12/0013 713/171 |
| 2016/0036788 A1* | 2/2016 | Conrad | H04W 12/08 713/168 |
| 2016/0234022 A1* | 8/2016 | Motika | H04L 9/0822 |
| 2017/0214664 A1* | 7/2017 | Birgisson | H04L 63/0428 |
| 2017/0324549 A1* | 11/2017 | Abramovsky | H04W 12/001 |
| 2019/0034618 A1* | 1/2019 | Dolev | G06F 21/606 |
| 2019/0089531 A1* | 3/2019 | Le Saint | H04L 9/0827 |
| 2019/0089532 A1* | 3/2019 | Lambert | H04L 9/0844 |
| 2019/0097793 A1* | 3/2019 | Nix | H04L 9/14 |
| 2019/0097794 A1* | 3/2019 | Nix | H04L 9/0861 |
| 2019/0245681 A1* | 8/2019 | Alwen | H04L 9/085 |
| 2019/0245682 A1* | 8/2019 | Alwen | H04L 9/0822 |
| 2019/0288860 A1* | 9/2019 | Poltorak | H04W 12/02 |
| 2019/0332774 A1* | 10/2019 | Nix | H04L 63/0428 |
| 2020/0052905 A1* | 2/2020 | Mathias | H04L 9/3247 |

FOREIGN PATENT DOCUMENTS

| | | |
|---|---|---|
| CN | 105119939 A | 12/2015 |
| EP | 1554834 A1 | 7/2005 |
| EP | 2999271 A1 | 3/2016 |
| EP | 3065334 A1 | 9/2016 |
| EP | 2999271 B1 | 4/2019 |

OTHER PUBLICATIONS

"Elliptic-curve cryptography," Wikipedia, Retrieved from the Internet: https://en.wikipedia.org/wiki/Elliptic-curve_cryptography (Jun. 20, 2019).

EP/17745535.9-1218, Office Action, dated May 15, 2020.

Manweiler et al., "We Saw Each Other on the Subway: Secure, Anonymous Proximity-Based Missed Connections," XP058362036, pp. 1-6 (Feb. 2009).

* cited by examiner

SYSTEM AND METHOD FOR CONFIGURING A WIRELESS DEVICE FOR WIRELESS NETWORK ACCESS

CROSS-REFERENCE TO RELATED APPLICATIONS

This application is a continuation of International Application No. PCT/SG2017/050357, filed on Jul. 18, 2017, which claims priority to Singapore Patent Application No. 10201609247Y, filed on Nov. 4, 2016. The disclosures of the aforementioned applications are hereby incorporated by reference in their entireties.

TECHNICAL FIELD

This disclosure relates to a system and method for configuring a second wireless device to access a wireless network using a first wireless device whereby one-round key exchange protocol is adopted to share the wireless network's configuration data with the second wireless device in an efficient and secure manner.

BACKGROUND

As technology advances, more and more devices seamlessly communicate wirelessly with one another through the Internet or directly between themselves. This convergence has resulted in the vision of the Internet of Things ("IoT") gaining more traction through recent years. In Internet of Things networks, millions of entities or devices (i.e. Things) will be connected to one another either directly or indirectly via access points. These devices, which may include devices or entities such as smart devices, smart plugs, smart watches, smart phones, smart vehicles, smart buildings, and etc., either communicate directly with one another or indirectly via existing IEEE wireless standards such as IEEE 802.11 wireless local area network (LAN) standards.

In order for any wireless device to gain access to an existing wireless network, these devices would require the wireless network's configuration. For example, when a wireless device attempts to connect to a wireless network via an access point for a first time to gain access to the network or the Internet, the wireless device will be prompted by the access point to provide a pre-determined password. If an incorrect password is provided, the wireless device will be denied access to the wireless network.

Similarly, when an IoT device intends to gain access to a wireless network for the first time, the IoT device will need to provide an appropriate password when prompted. Unlike conventional wireless devices, most IoT devices are not provided with input interfaces such as a keyboard, a mouse or a touchpad, or even a graphical user interface such as a display. Hence, it is a challenge for a user of IoT devices to enter a wireless network's password in a secure manner when prompted to do so.

A number of different approaches have been developed by those skilled in the art to address the manner in which IoT devices are configured to access wireless networks. One method that has been proposed involves the use of a mobile phone to configure the IoT device to access a target wireless network (i.e. the WLAN) whereby the process of configuring the IoT device takes place on a different wireless network. In particular, the IoT device first creates a wireless network, such as a Bluetooth network and upon detecting the existence of the Bluetooth network; the mobile device will connect to it. The mobile device then detects from the Bluetooth network that the IoT device is awaiting configuration data to gain access to a WLAN. At this step, it is assumed that the mobile device has the required configuration data and is connected to the WLAN. The mobile device will then connect to the IoT device via the Bluetooth network and will then transmit configuration data of the WLAN to the IoT device. Upon receiving the configuration data, the IoT device may then connect to the WLAN. Once the mobile device has detected the presence of the IoT device in the WLAN, the mobile phone will then verify that the IoT device has been correctly configured to access the WLAN.

The downside to this approach is that the IoT device has to first create a wireless network, e.g. a Bluetooth network, which is different from the wireless network that the IoT device wishes to gain access to. This means that the IoT device has to be provided with the means to create such a wireless network. Further, as the configuration data is transmitted from the mobile device to the IoT device, the data is only encrypted using basic encryption methods. Any malicious source who intercepts this data may possibly gain access to the configuration data through brute force attack means and once the configuration data has been exposed, the wireless network and any connected devices will then be vulnerable to attacks from malicious entities.

For the above reasons, those skilled in the art are constantly striving to come up with a system and method to configure an IoT device to access a wireless network using a wireless device whereby the wireless network's configuration data is provided to the IoT wireless device from the wireless device in a secure and efficient manner.

SUMMARY

Systems and methods to improve the process of configuring a second wireless device to access a wireless network using a first wireless device are proposed, and these systems and methods are set out below in accordance with embodiments of the disclosure.

A first improvement proposed by embodiments of systems and methods in accordance with the disclosure is that configuration data to access a wireless network is shared between a first and a second wireless device in an efficient and secure manner.

A second improvement proposed by embodiments of systems and methods in accordance with the disclosure is that both devices are authenticated and the configuration data is securely shared between the two authenticated wireless devices through a single exchange of data between the two wireless devices.

The above improvements are provided by embodiments of a method in accordance with the disclosure operating in the following manner.

According to a first aspect of the disclosure, a method for configuring a second wireless device to access a wireless network using a first wireless device, the method comprising: generating a first message of a one-round key exchange protocol; embedding the first message into a beacon packet and broadcasting the beacon packet such that the second wireless device receives the first message and responds by generating a message based on the first message; receiving the message from the second wireless device, wherein the message comprises encrypted configuration data and a second message of the one-round key exchange protocol; computing a shared key KS using the first message and the second message; decrypting the encrypted configuration data using the shared key KS; and accessing the wireless network using the configuration data.

With reference to the first aspect, in a first possible implementation manner of the first aspect, message further comprises a message authentication code (MAC) generated by the second wireless device, wherein before the step of decrypting the encrypted configuration data using the shared key KS, the method further comprises verifying the MAC using the computed shared key KS; and the step of decrypting the encrypted configuration data using the shared key KS comprises decrypting the encrypted configuration data using the shared key KS when the MAC is verified.

With reference to the first aspect or the first possible implementation manner of the first aspect, in a second possible implementation manner of the first aspect, wherein the one-round key exchange protocol comprises a Two-Basis Password Exponential Key Exchange (TBPEKE) protocol, wherein the first message comprises a first token computed using a shared token GS and a random value x, the second message comprises a second token computed using the shared token GS and a random value y, and the shared key KS is computed using the shared token GS and the random values x and y, and whereby the shared token is derived using two fixed points (U, V) on an Elliptic Curve Cryptography (ECC) and a random value w that were pre-loaded in the first and second wireless devices.

With reference to the second possible implementation manner of the first aspect, in a third possible implementation manner of the first aspect, the first token is computed by multiplying the shared token GS with the random value x, the second token is computed by multiplying the shared token GS with the random value y, the shared key KS is computed by multiplying the shared token GS with the random values x and y, and the shared token GS is derived by: $GS=U+w \cdot V$.

With reference to the first aspect or the first possible implementation manner of the first aspect, in a fourth possible implementation manner of the first aspect, the one-round key exchange protocol comprises an Elliptic Curve Diffie-Hellman (ECDH) protocol, wherein the first message comprises a first public key computed using a first private key and a finite cyclic group G, the second key comprises a second public key computed using a second private key and the finite cyclic group G, and the shared key KS is computed using the first private key, the second private key and the finite cyclic group G, and whereby the finite cyclic group G is pre-loaded in the first and second wireless devices.

With reference to the fourth possible implementation manner of the first aspect, in a fifth possible implementation manner of the first aspect, the first public key is computed by multiplying the first private key with the finite cyclic group G, the second public key is computed by multiplying the second private key with the finite cyclic group G, and the shared key KS is computed by multiplying the first private key with the second private key and the finite cyclic group G.

According to a second aspect of the disclosure, a first wireless device for configuring a second wireless device to access a wireless network is provided whereby the first wireless device comprises circuitry configured to: generate a first message of a one-round key exchange protocol; embed the first message into a beacon packet and broadcasting the beacon packet such that the second wireless device receives the first message and responds by generating a message based on the first message; receive the message from the second wireless device, wherein the message comprises encrypted configuration data and a second message of the one-round key exchange protocol; compute a shared key KS using the first message and the second message; decrypt the encrypted configuration data using the shared key KS; and access the wireless network using the configuration data.

With reference to the second aspect, in a first possible implementation manner of the second aspect, the received message further comprises a message authentication code (MAC) generated by the second wireless device, wherein before the circuitry decrypts the encrypted configuration data using the shared key KS, the circuitry is configured to verify the MAC using the computed shared key KS; and the circuitry configured to decrypt the encrypted configuration data using the shared key KS comprises circuitry configured to decrypt the encrypted configuration data using the shared key KS when the MAC is verified.

With reference to the second aspect or the first possible implementation manner of the second aspect, in a second possible implementation manner of the second aspect, the one-round key exchange protocol comprises a Two-Basis Password Exponential Key Exchange (TBPEKE) protocol, wherein the first message comprises a first token computed using a shared token GS and a random value x, the second message comprises a second token computed using the shared token GS and a random value y, and the shared key KS is computed using the shared token GS and the random values x and y, and whereby the shared token is derived using two fixed points (U, V) on an Elliptic Curve Cryptography (ECC) and a random value w that were pre-loaded in the first and second wireless devices.

With reference to the second possible implementation manner of the second aspect, in a third possible implementation manner of the second aspect, the first token is computed by multiplying the shared token GS with the random value x, the second token is computed by multiplying the shared token GS with the random value y, the shared key KS is computed by multiplying the shared token GS with the random values x and y, and the shared token GS is derived by: $GS=U+w \cdot V$ With reference to the second aspect or the first possible implementation manner of the second aspect, in a fourth possible implementation manner of the second aspect, the one-round key exchange protocol comprises an Elliptic Curve Diffie-Hellman (ECDH) protocol, wherein the first message comprises a first public key computed using a first private key and a finite cyclic group G, the second key comprises a second public key computed using a second private key and the finite cyclic group G, and the shared key KS is computed using the first private key, the second private key and the finite cyclic group G, and whereby the finite cyclic group G is pre-loaded in the first and second wireless devices.

With reference to the fourth possible implementation manner of the second aspect, in a fifth possible implementation manner of the second aspect, the first public key is computed by multiplying the first private key with the finite cyclic group G, the second public key is computed by multiplying the second private key with the finite cyclic group G, and the shared key KS is computed by multiplying the first private key with the second private key and the finite cyclic group G.

According to a third aspect of the disclosure, a first wireless device for configuring a second wireless device to access a wireless network is provided whereby the first wireless device comprises a generating unit, an embedding unit, a receiving unit, a computing unit, a decrypting unit, and an accessing unit. The generating unit is configured to generate a first message of a one-round key exchange protocol, the embedding unit is configured to embed the first message into a beacon packet and broadcasting the beacon packet such that the second wireless device receives the first message and responds by generating a message based on the first message; the receiving unit is configured to receive a message from the second wireless device, wherein the message comprises encrypted configuration data and a second message of the one-round key exchange protocol; the computing unit is configured to compute a shared key KS using the first message and the second message; the decrypting unit is configured to decrypt the encrypted configuration data using the shared key KS; and the accessing unit is configured to access the wireless network using the configuration data.

With reference to the third aspect, in a first possible implementation manner of the third aspect, the received message further comprises a message authentication code (MAC) generated by the second wireless device, wherein before the decrypting unit decrypts the encrypted configuration data using the shared key KS, the decrypting unit is configured to verify the MAC using the computed shared key KS; and the decrypting unit configured to decrypt the encrypted configuration data using the shared key KS comprises a MAC unit configured to decrypt the encrypted configuration data using the shared key KS when the MAC is verified.

With reference to the third aspect or the first possible implementation manner of the third aspect, in a second possible implementation manner of the third aspect, the one-round key exchange protocol comprises a Two-Basis Password Exponential Key Exchange (TBPEKE) protocol, wherein the first message comprises a first token computed using a shared token GS and a random value x, the second message comprises a second token computed using the shared token GS and a random value y, and the shared key KS is computed using the shared token GS and the random values x and y, and whereby the shared token is derived using two fixed points (U, V) on an Elliptic Curve Cryptography (ECC) and a random value w that were pre-loaded in the first and second wireless devices.

With reference to the second possible implementation manner of the third aspect, in a third possible implementation manner of the third aspect, the first token is computed by multiplying the shared token GS with the random value x, the second token is computed by multiplying the shared token GS with the random value y, the shared key KS is computed by multiplying the shared token GS with the random values x and y, and the shared token GS is derived by: GS=U+w·V With reference to the third aspect or first possible implementation manner of the third aspect, in a fourth possible implementation manner of the third aspect, the one-round key exchange protocol comprises an Elliptic Curve Diffie-Hellman (ECDH) protocol, wherein the first message comprises a first public key computed using a first private key and a finite cyclic group G, the second key comprises a second public key computed using a second private key and the finite cyclic group G, and the shared key KS is computed using the first private key, the second private key and the finite cyclic group G, and whereby the finite cyclic group G is pre-loaded in the first and second wireless devices.

With reference to the fourth possible implementation manner of the third aspect, in a fifth possible implementation manner of the third aspect, the first public key is computed by multiplying the first private key with the finite cyclic group G, the second public key is computed by multiplying the second private key with the finite cyclic group G, and the shared key KS is computed by multiplying the first private key with the second private key and the finite cyclic group.

According to a fourth aspect of the disclosure, a first wireless device for configuring a second wireless device to access a wireless network is provided, the first wireless device comprises:

a processor; and a non-transitory media readable by the processor, the non-transitory media storing instructions that when executed by the processor, cause the processor to:

generate a first message of a one-round key exchange protocol;

embed the first message into a beacon packet and broadcast the beacon packet such that the second wireless device receives the first message and responds by generating a message based on the first message;

receive the message from the second wireless device, wherein the message comprises encrypted configuration data and a second message of the one-round key exchange protocol;

compute a shared key $K_S$ using the first message and the second message;

decrypt the encrypted configuration data using the shared key $K_S$; and access the wireless network using the configuration data.

With reference to the fourth aspect, in a first possible implementation manner of the fourth aspect, wherein the received message further comprises a message authentication code (MAC) generated by the second wireless device, wherein before the instructions direct the processor to decrypt the encrypted configuration data using the shared key $K_S$, the instructions direct the processor to:

verify the MAC using the computed shared key $K_S$; and the instructions to direct the processor to decrypt the encrypted configuration data using the shared key $K_S$ comprises:

instructions to direct the processor to decrypt the encrypted configuration data using the shared key $K_S$ when the MAC is verified.

With reference to the fourth aspect or the first possible implementation manner of the fourth aspect, in a second possible implementation manner of the fourth aspect, wherein the one-round key exchange protocol comprises a Two-Basis Password Exponential Key Exchange (TBPEKE) protocol, wherein the first message comprises a first token computed using a shared token $G_S$ and a random value x, the second message comprises a second token computed using the shared token $G_S$ and a random value y, and the shared key $K_S$ is computed using the shared token $G_S$ and the random values x and y, and whereby the shared token is derived using two fixed points (U, V) on an Elliptic Curve Cryptography (ECC) and a random value w that were pre-loaded in the first and second wireless devices.

With reference to the second possible implementation manner of the fourth aspect, in a third possible implementation manner of the fourth aspect, wherein the first token is computed by multiplying the shared token GS with the random value x, the second token is computed by multiplying the shared token GS with the random value y, the shared key KS is computed by multiplying the shared token GS with the random values x and y, and the shared token GS is derived by:

$$G_S = U + w \cdot V.$$

With reference to the fourth aspect or the first possible implementation manner of the fourth aspect, in a fourth possible implementation manner of the fourth aspect, wherein the one-round key exchange protocol comprises an Elliptic Curve Diffie-Hellman (ECDH) protocol, wherein the first message comprises a first public key computed using a first private key and a finite cyclic group G, the second key comprises a second public key computed using a second private key and the finite cyclic group G, and the shared key $K_S$ is computed using the first private key, the second private key and the finite cyclic group G, and whereby the finite cyclic group G is pre-loaded in the first and second wireless devices.

With reference to the fourth possible implementation manner of the fourth aspect, in a fifth possible implementation manner of the fourth aspect, wherein the first public key is computed by multiplying the first private key with the finite cyclic group G, the second public key is computed by multiplying the second private key with the finite cyclic group G, and the shared key KS is computed by multiplying the first private key with the second private key and the finite cyclic group G.

BRIEF DESCRIPTION OF THE DRAWINGS

The above advantages and features in accordance with this disclosure are described in the following detailed description and are shown in the following drawings.

DETAILED DESCRIPTION

This disclosure relates to a system and method for configuring a second wireless device to access a target wireless network using a first wireless device whereby one-round key exchange protocol is adopted to share the wireless network's configuration data with the second wireless device in an efficient and secure manner. In particular, when one-round key exchange protocol is adopted, this protocol allows both wireless devices to be authenticated and subsequently, for a shared encryption key to be established between both wireless devices. The shared encryption key is then utilized to encrypt the target wireless network's configuration data and the encrypted data is then securely shared between the two authenticated wireless devices. It should be noted that all this takes place through a single exchange of data between these two wireless devices.

One skilled in the art will recognize that many functional units in this description have been labelled as modules throughout the specification. The person skilled in the art will also recognize that a module may be implemented as electronic circuits, logic chips or any combination of electrical and/or electronic discrete components. Further, one skilled in the art will also recognize that a module may be implemented in software which may then be executed by a variety of processors. In embodiments of the disclosure, a module may also comprise computer instructions or executable code that may instruct a computer processor to carry out a sequence of events based on instructions received. The choice of the implementation of the modules is left as a design choice to a person skilled in the art and does not limit the scope of this disclosure in any way.

Figure 1:
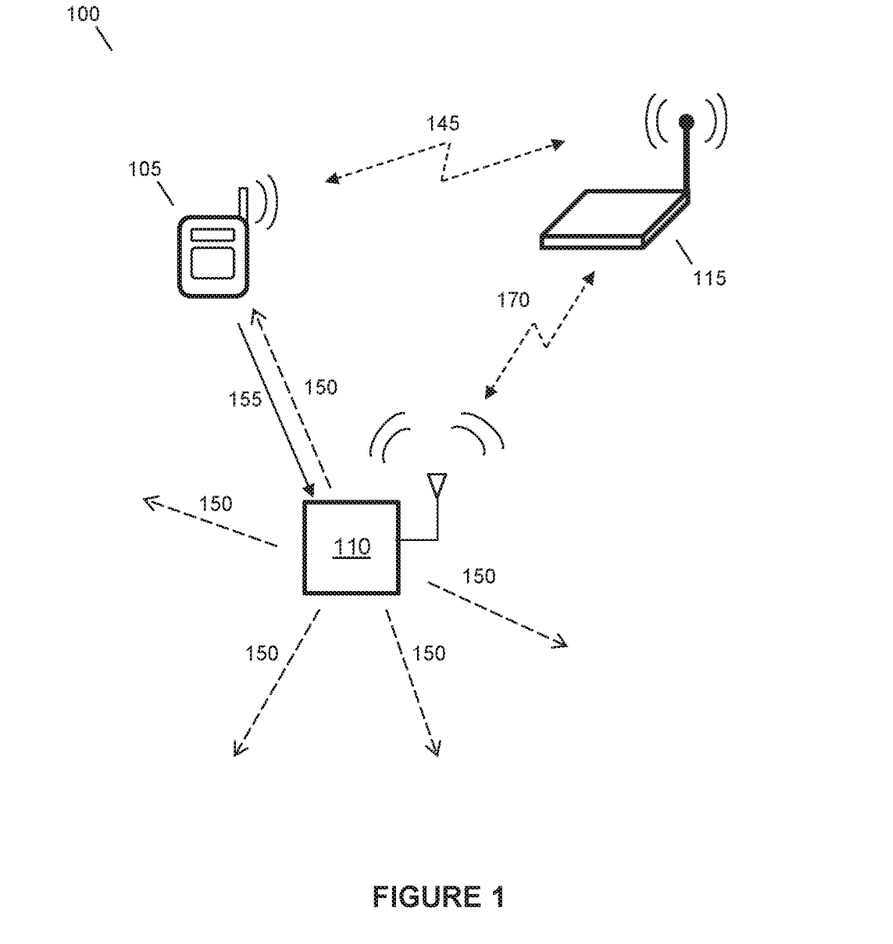
FIG. 1 illustrating an exemplary block diagram of a network in which a first device configures a second device to access a target wireless network in accordance with embodiments of the disclosure.

FIG. 1 illustrates an exemplary block diagram of a network in which features in accordance with embodiments of the disclosure may be implemented. Network 100 illustrated in FIG. 1 comprises wireless devices 105 and 110, and also access point 115. Wireless devices 105 and 110 each may comprise, but is not limited to, any device that is able to carry out wireless communicative functions such as smart phones, computers, tablet computers, mobile computers, netbooks or wearable electronic devices such as smart watches, smart plugs, or any smart devices that may be configured to transmit and receive data wirelessly. One skilled in the art will recognize that wireless devices 105 or 110 may also comprise IoT enabled devices such as printers, display devices, home appliances, lighting appliances and etc.

Wireless device 105 may connect directly with wireless device 110 through direct networking means including, but not limited to, Wi-Fi networks, Bluetooth networks or Near Field Communication (NFC). It should be noted that wireless devices 105 and 110 may also utilize indirect means 145 and 175 (via access point 115) to exchange data messages with one another. Wireless devices 105 and 110 may also be configured to broadcast beacon frames 150. A beacon frame 150 may contain a timestamp, an interval, capability information, a service set identifier (SSID), and so on.

Access point 115 is a wireless device that acts as a central connection point indirectly connecting wireless devices to each other or to internal or external (i.e. the Internet) wireless networks. For example, access point 115 may be used as a central connection point for the IEEE 802.11 Wi-Fi standard, connecting wireless devices to the Internet or to other wireless devices. Typically, access point 115 would be provided with security protocols and/or security certification programs such as Wi-Fi Protected Access (WPA) or Wi-Fi Protected Access II (WPA2). These security/authentication frameworks require that when a wireless device connects to access point 115 to gain access to connected wireless networks or wireless devices for the first time, the wireless device must first provide the pre-determined security/authentication credentials to the access point. Once the wireless device has provided the necessary configuration data or security/authentication credentials for the access point, the wireless device may continually connect to access point 115 until the security credentials are changed by access point 115.

Figure 2:
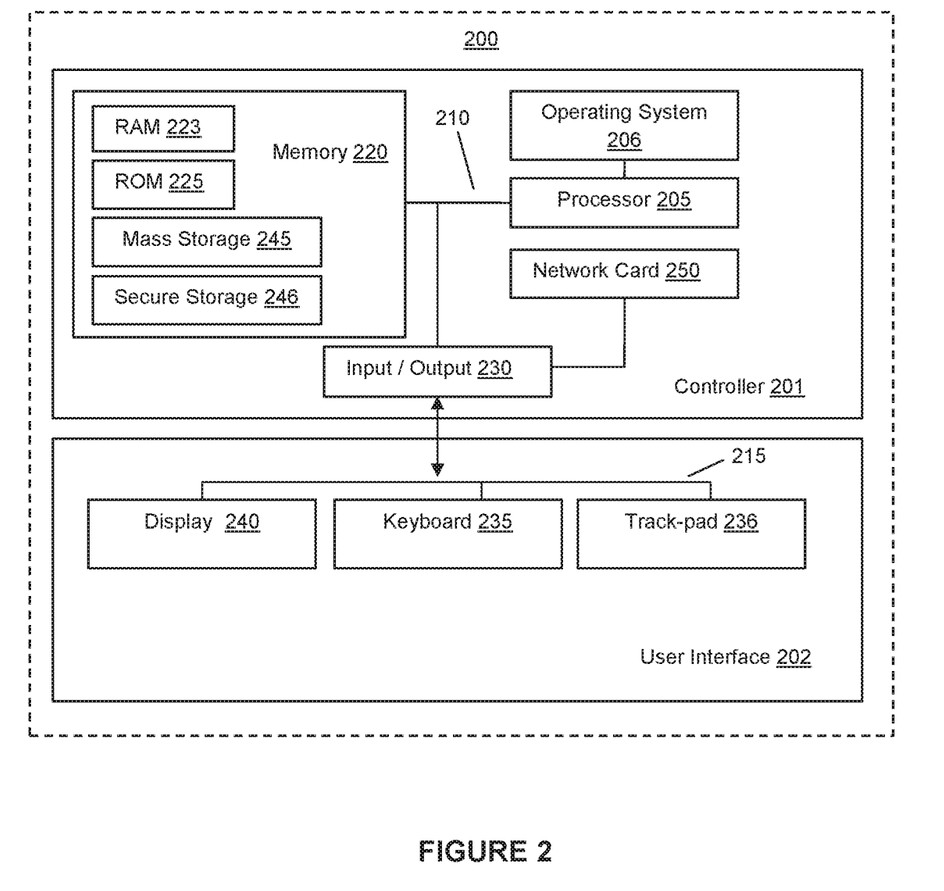
FIG. 2 illustrating a block diagram representative of components in an electronic device for implementing embodiments in accordance with embodiments of the disclosure.

FIG. 2 illustrates a block diagram representative of components of module 200 that may be provided within wireless devices 105, 110 and access point 115 for implementing embodiments in accordance with embodiments of the disclosure. One skilled in the art will recognize that the exact configuration of each wireless device provided within the devices or the access point may be different and the exact configuration of module 200 may vary and FIG. 2 is provided by way of example only.

In embodiments of the disclosure, module 200 comprises controller 201 and user interface 202. User interface 202 is arranged to enable manual interactions between a user and module 200 and for this purpose includes the input/output components required for the user to enter instructions to control module 200. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, processor 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from electronic device 200 via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). Memory 220 also includes secure storage 246 for securely storing secret keys, or private keys. It should be noted that the contents within secure storage 246 are only accessible by a super-user or administrator of module 200 and may not be accessed by any user of module 200. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 205 may be provided by any suitable logic circuitry for receiving inputs, processing them in accordance with instructions stored in memory and generating outputs (for example to the memory components or on display 240). In this embodiment, processor 205 may be a single core or multi-core processor with memory addressable space. In one example, processor 205 may be multi-core, comprising—for example—an 8 core CPU.

Figure 3:
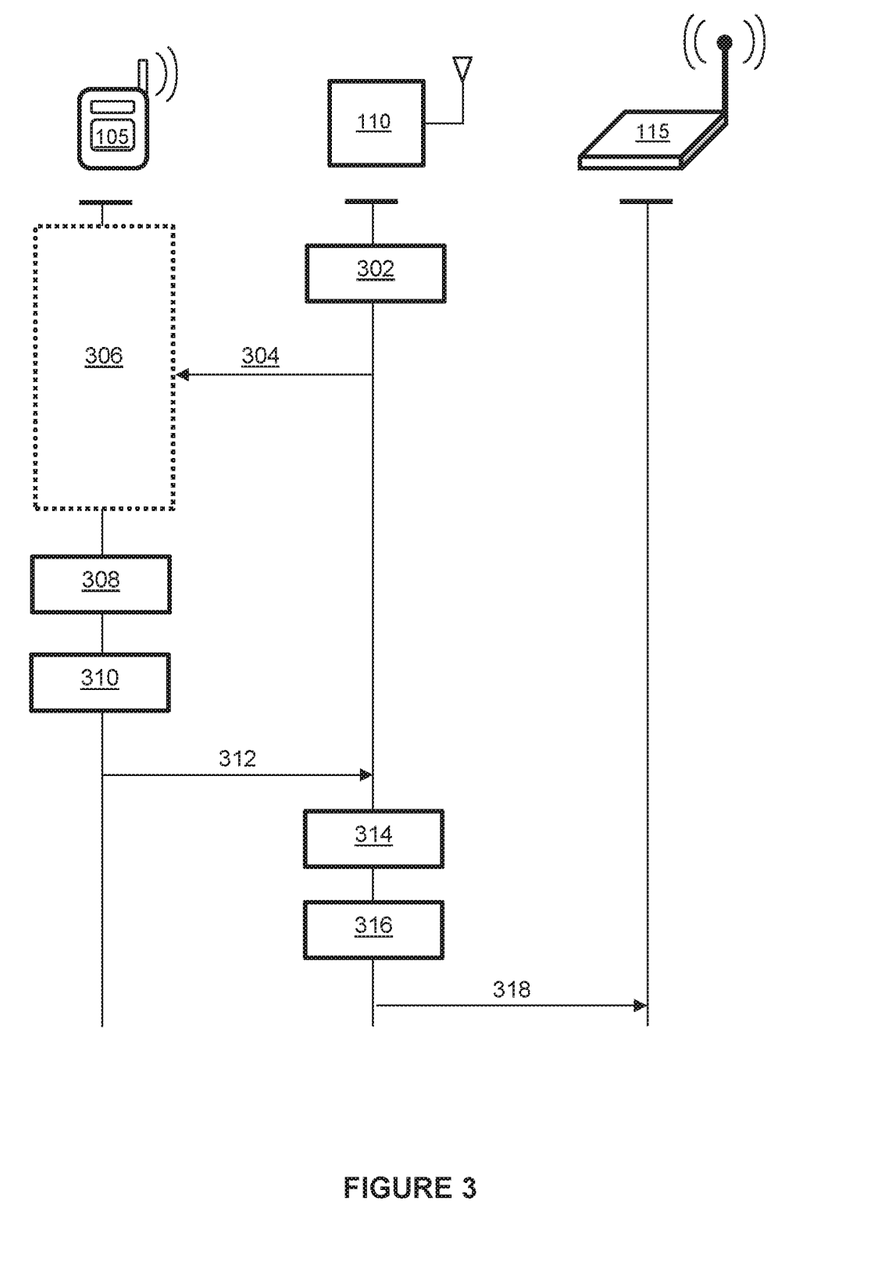
FIG. 3 illustrating a timing diagram for the secure sharing of configuration data to access a target wireless network between a first wireless device and a second wireless device in accordance with embodiments of the disclosure.

FIG. 3 illustrates a timing diagram for the secure sharing of configuration data between wireless devices 105 and 110 to access a target wireless network via access point 115 in accordance with embodiments of the disclosure. It is assumed that the configuration data or the security/authorization protocols to gain access to access point 115 are pre-loaded within wireless device 105. When wireless device 110 intends to obtain the necessary configuration data from wireless device 105 to connect to access point 115, wireless device 110 will initiate the sharing process by generating a first part or a first message of a one-round key exchange protocol at step 302. The first message will then be embedded within a Service Set Identification (SSID) of a beacon packet. This means that the size of the first key will have to be between 0 to 32 octets as the maximum size of a SSID in a beacon packet is 32 octets.

At step 304, wireless device 110 will then broadcast the beacon packet to all wireless devices within range. The broadcasting of the beacon packet is illustrated as broadcast 150 in FIG. 1. Throughout steps 302 and 304, wireless device 105 will be constantly scanning received broadcast signals for a beacon packet having a SSID that contains the first key. This continual scanning process takes place at step 306.

Once wireless device 105 has received the beacon packet and confirmed that the beacon packet was indeed broadcasted from wireless device 110, wireless device 105 will then proceed to extract the first message contained in the SSID of the received beacon packet. It should be noted that wireless device 105 may verify an origin of a beacon packet by checking the contents of the received beacon packet's SSID. Wireless device 105 will then generate a second part or a second message of the one-round key exchange protocol adopted earlier by wireless device 110 at step 308. At step 310, wireless device 105 will then utilize the second message together with the extracted first message to compute a shared key KS. This shared key KS will then be used by wireless device 105 to encrypt the configuration data for access point 115. The configuration data may be encrypted using any standard symmetric encryption algorithm such as, but not limited to, the Advanced Encryption Standard (AES) with the shared key KS.

The encrypted configuration data and the second message are then both embedded into a message. The message is then transmitted to wireless device 110 at step 312. The transmission of the message from wireless device 105 to device 110 may take place via a Bluetooth network, a NFC network, a beacon broadcast or any other wireless transmission means.

Wireless device 110 will then receive the message transmitted from wireless device 105 at step 314. Device 110 will then extract the second message and encrypted configuration data from the received message. The second message will then be utilized together with the earlier generated first message to compute the shared key KS. Device 110 will then decrypt the encrypted configuration data using the computed shared key KS. If the encrypted configuration data may not be decrypted using the computed shared key KS, this would mean that device 110 had either received a corrupted message or that device 110 was not the intended recipient. Under the assumption that the configuration data has been successfully decrypted by device 110 at step 314, device 110 will then proceed to install the configuration data into its settings at step 316. Wireless device 110 may then connect to access point 115 at step 318 as device 110 had successfully installed the required configuration data.

In embodiments of the disclosure, at step 310, after wireless device 105 has encrypted the configuration data for access point 115 using the shared key KS, device 105 will utilize the shared key KS and the encrypted configuration data to generate a message authentication code (MAC). The generation of the MAC at this stage may be done using any keyed-hash message authentication code in combination with the shared key KS.

The encrypted configuration data, the second message and the MAC are then all embedded into a message which is then transmitted to wireless device 110 at step 312. When wireless device 110 receives this message at step 314, device 110 will then extract the second message, the encrypted configuration data and the MAC from the received message. The second message will then be utilized together with the earlier generated first message to compute the shared key KS.

Once the shared key has been computed, device 110 will then verify the authenticity of the received message by verifying the MAC using the encrypted configuration data and the computed shared key. If the MAC is successfully verified, device 110 will proceed to decrypt the encrypted configuration data else device 110 will discard the message and its contents. Once the MAC has been successfully verified, device 110 will then decrypt the encrypted configuration data using the computed shared key KS and then proceed to install the configuration data into its settings as mentioned above.

In an embodiment of the disclosure, the one-round key exchange protocol adopted by wireless devices 105 and 110 may comprise an Elliptic Curve Diffie-Hellman (ECDH) protocol. As known by those skilled in the art, the ECDH protocol is an anonymous key agreement protocol that allows two parties to establish a shared secret over an insecure channel. This shared secret may then be directly utilized by both parties as a shared key to encrypt and decrypt subsequent communications using a symmetric key cipher. In order to adopt the ECDH protocol, wireless devices 105 and 110 will each have to be pre-loaded with certain ECDH domain parameters (p, a, b, G, n, h) in the prime case and each of wireless devices 105 and 110 will each have a key pair (private key, public key) suitable for elliptic curve cryptography.

In this embodiment of the disclosure, with reference to FIG. 3, wireless device 110 will generate a public key of the ECDH protocol at step 302. This is done by device 110 using the following equation:

$$Q_A = d_A \cdot G$$

where $Q_A$ is the public key for wireless device 110, $d_A$ is the temporary private key for wireless device 110 that is selected from the set [1, n−1] and G is a finite group.

The public key $Q_A$ will then be embedded within a SSID of a beacon packet and be broadcasted at step 304 to all wireless devices within range. Once wireless device 105 has detected the broadcast at step 306, wireless device 105 then proceeds to step 308 to extract the public key $Q_A$ contained in the SSID of the received beacon packet. Wireless device 105 will then generate its own public key of the ECDH protocol at step 308. This is done by device 105 using the following equation:

$$Q_B = d_B \cdot G$$

where $Q_B$ is the public key for wireless device 105, $d_B$ is the temporary private key for wireless device 105 that is selected from the set [1, n−1] and G is a finite group.

At step 310, wireless device 105 will then utilize public key QA and the temporary private key dB for wireless device 105 to compute the shared key KS. The shared key KS is computed as follows:

$$K_S = d_B \cdot Q_A$$

This shared key KS will then be used by wireless device 105 to encrypt the configuration data for access point 115. The encrypted configuration data and the public key QB are then both embedded into a message. The message is then transmitted to wireless device 110 at step 312.

Wireless device 110 will then receive the message transmitted from wireless device 105 at step 314. Device 110 will then extract the public key QB and the encrypted configuration data from the received message. The public key QB will then be utilized together with the earlier obtained temporary private key dA to compute the shared key KS. The shared key KS may be computed as follows:

$$K_S = d_A \cdot Q_B$$

Device 110 will then decrypt the encrypted configuration data using the computed shared key KS. Once this is done, device 110 will then proceed to install the configuration data into its settings at step 316. Wireless device 110 may then connect to access point 115 at step 318 as device 110 had successfully installed the required configuration data.

It should be noted in embodiments of the disclosure that at step 310, after wireless device 105 has encrypted the configuration data for access point 115 using the shared key KS, device 105 may utilize the shared key KS and the encrypted configuration data to generate a message authentication code (MAC).

The encrypted configuration data, the public key QB and the MAC are then all embedded into a message which is then transmitted to wireless device 110 at step 312. When wireless device 110 receives this message at step 314, device 110 will then extract the public key QB, the encrypted configuration data and the MAC from the received message. The public key QB will then be utilized together with the earlier obtained temporary private key dA to compute the shared key KS.

Once the shared key has been computed, device 110 will then verify the authenticity of the received message by verifying the MAC using the encrypted configuration data and the computed shared key KS. If the MAC is successfully verified, device 110 will proceed to decrypt the encrypted configuration data else device 110 will discard the message and its contents. Once the MAC has been successfully verified, device 110 will then decrypt the encrypted configuration data using the computed shared key KS and then proceed to install the configuration data into its settings as mentioned above.

In yet another embodiment of the disclosure, the one-round key exchange protocol adopted by wireless devices 105 and 110 may comprise a Two-Basis Password Exponential Key Exchange (TBPEKE) protocol. As known by those skilled in the art, this protocol enables two parties to establish a shared cryptographic key over an insecure channel based only on their knowledge of a shared password. This TBPEKE protocol could be implemented over Elliptic curve cryptography (ECC) or finite fields. In order to adopt the TBPEKE protocol, wireless devices 105 and 110 will each have to be pre-loaded with certain TBPEKE domain parameters (p, a, b, G, n, h), a pre-shared value w selected from the set [1, n−1] and two fixed ECC points (U, V).

In this embodiment of the disclosure, with reference to FIG. 3, wireless device 110 will generate a shared token of the TBPEKE protocol at step 302. This is done by device 110 using the following equation:

$$G_1 = U + w \cdot V$$

where $G_1$ is the shared token, U and V are the two fixed ECC points, and w is the pre-shared value. Device 110 then uses the shared token $G_1$ to compute token $X_A$ for device 110. This is done by device 110 as follows:

$$X_A = x \cdot G_1$$

where $G_1$ is the shared token, and x is a random number selected from the set [1,n−1].

The token XA will then be embedded within a SSID of a beacon packet and be broadcasted at step 304 to all wireless devices within range. Once wireless device 105 has detected the broadcast at step 306, wireless device 105 then proceeds to step 308 to extract the token XA contained in the SSID of the received beacon packet. Wireless device 105 will then generate its own token of the TBPEKE protocol at step 308. This is done by device 105 first computing its own shared token $G_1$ using the following equation:

$$G_1 = U + w \cdot V$$

where $G_1$ is the shared token, U and V are the two fixed ECC points, and w is the pre-shared value. Device 105 then uses the shared token $G_1$ to compute token $X_B$ for device 105. This is done by device 105 as follows:

$$X_B = y \cdot G_1$$

where $G_1$ is the shared token, and y is a random number selected from the set [1,n−1].

At step 310, wireless device 105 will then utilize the received token $X_A$ and the y (i.e. the random number selected from the set [1,n−1]) to compute the shared key $K_S$. The shared key $K_S$ is computed as follows:

$$K_S = y \cdot X_A$$

This shared key KS will then be used by wireless device 105 to encrypt the configuration data for access point 115. The encrypted configuration data and the token XB are then both embedded into a message. The message is then transmitted to wireless device 110 at step 312.

Wireless device 110 will then receive the message transmitted from wireless device 105 at step 314. Device 110 will then extract the token XB and the encrypted configuration data from the received message. The token XB will then be utilized together with the earlier value x to compute the shared key KS. The shared key KS may be computed as follows:

$$K_S = x \cdot X_B$$

Device 110 will then decrypt the encrypted configuration data using the computed shared key KS. Once this is done, device 110 will then proceed to install the configuration data into its settings at step 316. Wireless device 110 may then connect to access point 115 at step 318 as device 110 had successfully installed the required configuration data.

It should be noted in embodiments of the disclosure that at step 310, after wireless device 105 has encrypted the configuration data for access point 115 using the shared key KS, device 105 may utilize the shared key KS and the encrypted configuration data to generate a message authentication code (MAC). Similarly, the encrypted configuration data, the token XB and the MAC are then all embedded into a message which is then transmitted to wireless device 110 at step 312. When wireless device 110 receives this message at step 314, device 110 will then extract the token XB, the encrypted configuration data and the MAC from the received message. The token XB will then be utilized together with the earlier obtained value x to compute the shared key KS.

Once the shared key has been computed, device 110 will then verify the authenticity of the received message by verifying the MAC using the encrypted configuration data and the computed shared key KS. If the MAC is successfully verified, device 110 will proceed to decrypt the encrypted configuration data else device 110 will discard the message and its contents. Once the MAC has been successfully verified, device 110 will then decrypt the encrypted configuration data using the computed shared key KS and then proceed to install the configuration data into its settings as mentioned above.

A person skilled in the art will recognize that the one round key exchange used in this disclosure may comprise ECDH, TBPEKE, SPAKE (simple password authenticated key exchange), SPAKE2, SPAKE2+, SPEKE (Simple Password Exponential Key Exchange), and so on.

In accordance with embodiments of the disclosure, a method for configuring a second wireless device to access a wireless network using a first wireless device comprises the first wireless device carrying out the following six steps:

Step 1, generating a first message of a one-round key exchange protocol;

Step 2, embedding the first message into a beacon packet and broadcasting the beacon packet;

Step 3, receiving a message from the second wireless device, wherein the message comprises encrypted configuration data and a second message of the one-round key exchange protocol;

Step 4, computing a shared key $K_S$ using the first message and the second message;

Step 5, decrypting the encrypted configuration data using the shared key $K_S$; and Step 6, accessing the wireless network using the configuration data.

In order to provide such a system or method, a process is needed for configuring a second wireless device to access a wireless network using a first wireless device. The following description and FIGS. 4 to 6 describe embodiments of processes that provide processes in accordance with this disclosure.

Figure 4:
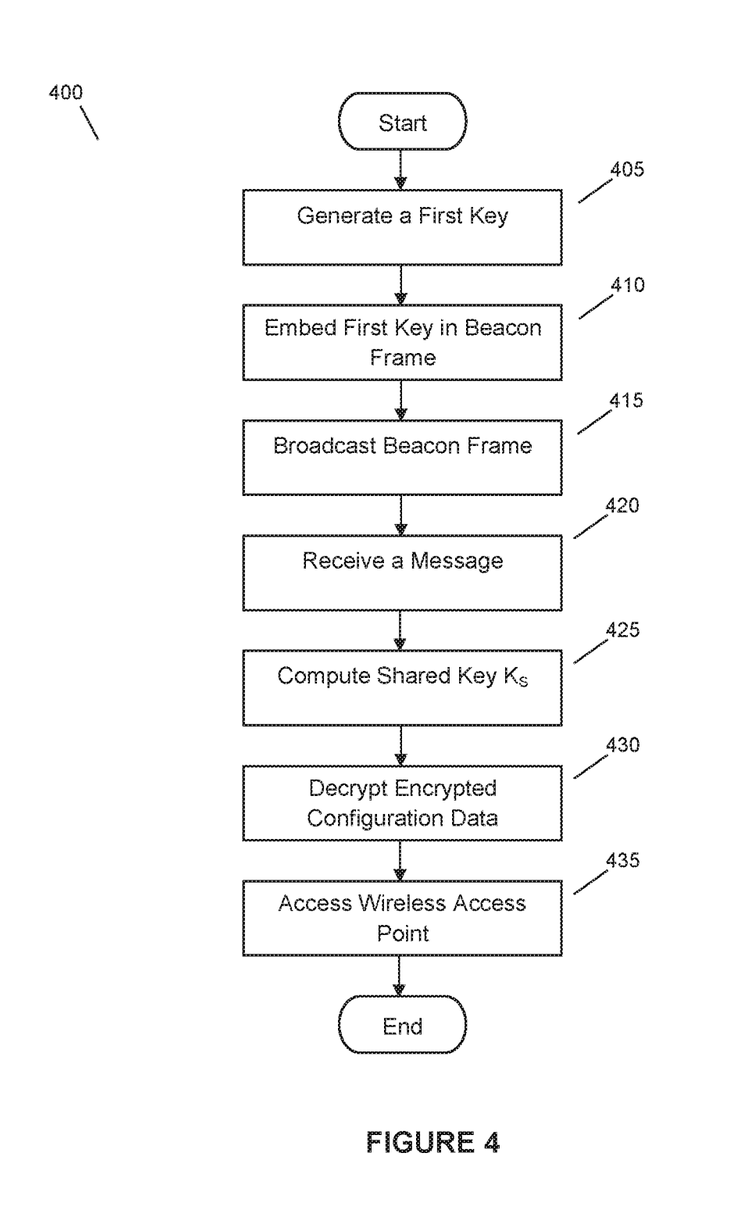
FIG. 4 illustrating a flow diagram showing a process in a second wireless device for obtaining configuration data to access a wireless network in accordance with embodiments of the disclosure.

FIG. 4 illustrates process 400 that is performed by the second wireless device to obtain configuration information from a first wireless device to access a target wireless network via an access point.

Process 400 begins at step 405 whereby the second wireless device generates a first message of a one-round key exchange protocol. In accordance with embodiments of the disclosure, the one-round key exchange protocol may comprise a ECDH or TBPEKE protocol.

Process 400 then proceeds to step 410 whereby the first message is embedded into a beacon frame and this beacon frame is then broadcasted by process 400 at step 415. Typically, the first message will be embedded in the SSID of the beacon packet. After process 400 has broadcasted the beacon frame, process 400 will wait for a response. When process 400 receives a message, process 400 will then proceed to step 420. At step 420, although it is not shown in the flowchart, process 400 will verify the received message by trying to extract a second message of the adopted one-round key exchange protocol and an encrypted configuration data from the message.

If process 400 is successful in extracting these parameters, process 400 then proceeds to step 425. At step 425, process 400 will compute shared key KS using the extracted second message and the first message. The shared key KS will then be used by process 400 to decrypt the encrypted configuration data at step 430. Process 400 then utilizes the configuration data to configure the second wireless device to access the wireless access point of the target wireless network at step 435. Process 400 then ends.

Figure 5:
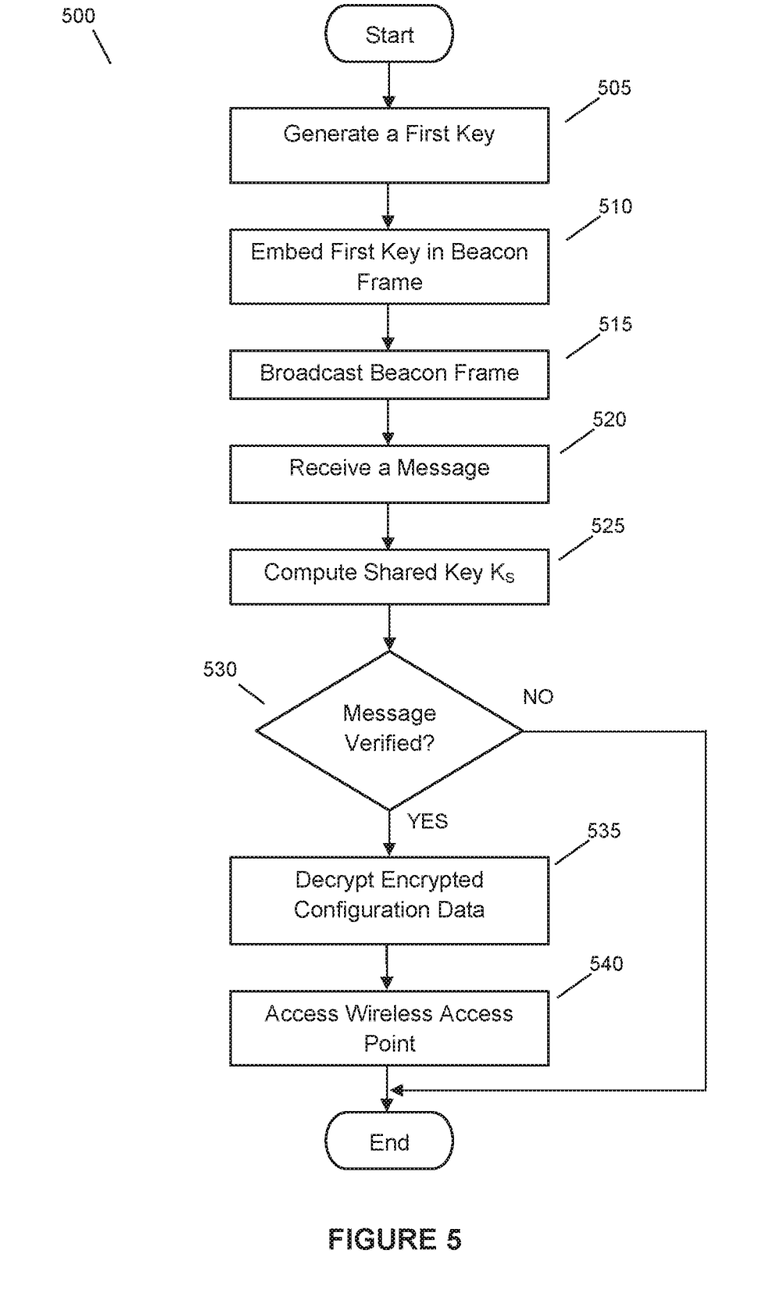
FIG. 5 illustrating a flow diagram showing a process in a second wireless device for obtaining configuration data to access a wireless network whereby the process involves the verification of a MAC in the received message in accordance with embodiments of the disclosure.

FIG. 5 illustrates another embodiment of process 400 that is performed by the second wireless device to obtain configuration information from a first wireless device to access a target wireless network via an access point. In this embodiment of the disclosure, the message received by the second wireless device contains a MAC which is used to verify the authenticity of the received message.

Process 500 begins at step 505 whereby the second wireless device generates a first message of a one-round key exchange protocol. Process 500 then proceeds to step 510 whereby the first message is embedded into a beacon frame and this beacon frame is then broadcasted by process 500 at step 515. After process 500 has broadcasted the beacon frame, process 500 will wait for a response. When process 500 receives a message, process 500 will then proceed to step 520. At step 520, process 500 extracts a MAC, a second message and an encrypted configuration data.

At step 525, process 400 will compute shared key KS using the extracted second message and the first message. The shared key KS will then be used by process 500 together with the encrypted configuration data to compute a MAC. Process 500 then verifies if the MAC extracted from the message matches with the computed MAC at step 530. If these two values match, the message is verified and process 500 proceeds to step 535. At step 535, the shared key KS will then be used to decrypt the encrypted configuration data. Process 500 then utilizes the configuration data to configure the second wireless device to access the wireless access point of the target wireless network at step 540. Process 500 then ends.

Returning to step 530. If the MAC extracted from the message does not match with the computed MAC at this step, this means that the message is not verified and process 500 ends here.

Figure 6:
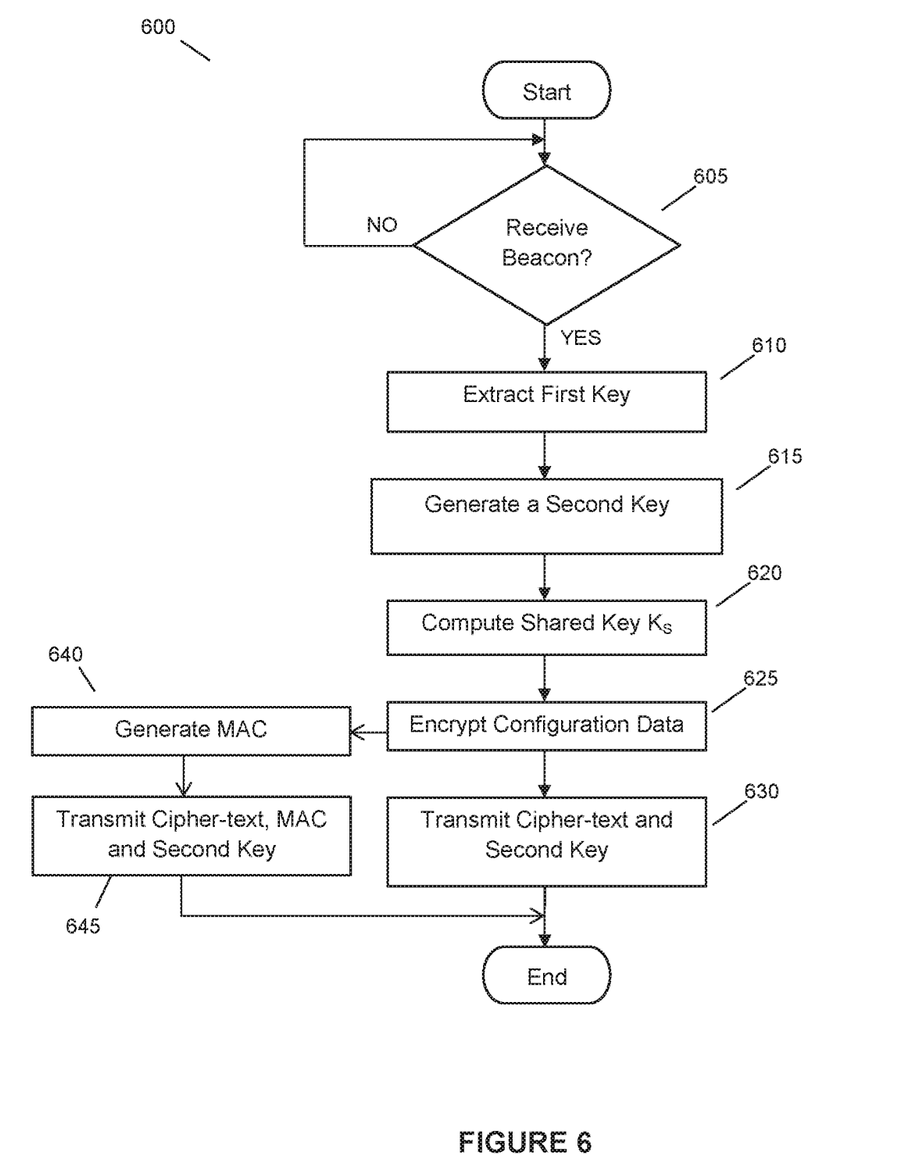
FIG. 6 illustrating a flow diagram showing a process in a first wireless device for initiating and transmitting configuration data to access a wireless network securely in accordance with embodiments of the disclosure.

FIG. 6 illustrates process 600 that is performed by a first wireless device to transmit configuration information to a second wireless device to allow the second wireless device to access a wireless network securely in accordance with embodiments of the disclosure.

Process 600 begins at step 605 where process 600 is constantly listening or waiting to receive a beacon packet. If process 600 receives a beacon packet, process 600 proceeds to step 610. At this step, process 600 will then extract a first message of a one-round key exchange protocol from the beacon packet. Typically, the first message will be embedded in the SSID of the beacon packet.

Process 600 then proceeds to generate a second message of the one-round key exchange protocol and the first and second messages are used by process 600 at step 620 to compute shared key KS. At step 625, shared key KS is used to encrypt configuration data. Process 600 then embeds shared key KS and the encrypted configuration data or cipher-text into a message which is then transmitted to the second wireless device. Process 600 then ends.

Returning to step 625, in another embodiment of this disclosure, process 600 proceeds to step 640 instead. At step 640, process 600 uses shared key KS and the encrypted configuration data to generate a MAC. Process 600 then proceeds to step 645 whereby the MAC, the shared key KS, and the encrypted configuration data are then embedded into a message and transmitted to the second wireless device. Process 600 then ends.

The above is a description of embodiments of a system and process in accordance with the present disclosure as set forth in the following claims. It is envisioned that others may and will design alternatives that fall within the scope of the following claims.

What is claimed is:

1. A method for accessing a wireless network, the method comprising:
   generating, by a first device, a first message of a one-round key exchange protocol;
   embedding, by the first device, the first message into a beacon packet and broadcasting the beacon packet such that a second wireless device receives the first message and responds by generating a response message based on the first message;
   receiving, by the first device, the response message from the second wireless device, wherein the response message comprises encrypted configuration data and a second message of the one-round key exchange protocol;
   computing, by the first device, a shared key $K_S$ using the first message and the second message;
   decrypting, by the first device, the encrypted configuration data using the shared key $K_S$; and
   accessing, by the first device, the wireless network using the configuration data
   wherein the one-round key exchange protocol comprises a Two-Basis Password Exponential Key Exchange (TBPEKE) protocol,
   wherein the first message comprises a first token computed using a shared token $G_S$ and a random value x, the second message comprises a second token computed using the shared token $G_S$ and a random value y, and the shared key $K_S$ is computed using the shared token $G_S$ and the random values x and y, and
   whereby the shared token is derived using two fixed points (U, V) on an Elliptic Curve Cryptography (ECC) and a random value w that were pre-loaded in the first and second wireless devices.

2. The method according to claim 1, wherein the response message further comprises a message authentication code (MAC) generated by the second wireless device,
   wherein before the step of decrypting the encrypted configuration data using the shared key $K_S$, the method further comprises:
   verifying the MAC using the computed shared key $K_S$; and
   wherein the step of decrypting the encrypted configuration data using the shared key $K_S$ comprises:
   decrypting the encrypted configuration data using the shared key $K_S$ in response to verifying the MAC.

3. The method according to claim 1, wherein the first token is computed by multiplying the shared token $G_S$ with the random value x, the second token is computed by multiplying the shared token $G_S$ with the random value y, the shared key $K_S$ is computed by multiplying the shared token $G_S$ with the random values x and y, and the shared token $G_S$ is derived by:

$$G_S = U + w \cdot V.$$

4. The method according to claim 1,
wherein the one-round key exchange protocol comprises an Elliptic Curve Diffie-Hellman (ECDH) protocol,
wherein the first message comprises a first public key computed using a first private key and a finite cyclic group G, the second key comprises a second public key computed using a second private key and the finite cyclic group G, and the shared key $K_S$ is computed using the first private key, the second private key and the finite cyclic group G, and
whereby the finite cyclic group G is pre-loaded in the first and second wireless devices.

5. The method according to claim 4, wherein the first public key is computed by multiplying the first private key with the finite cyclic group G, the second public key is computed by multiplying the second private key with the finite cyclic group G, and the shared key $K_S$ is computed by multiplying the first private key with the second private key and the finite cyclic group G.

6. A first wireless device, comprising:
a processor; and
a memory readable by the processor, the memory storing instructions that when executed by the processor, cause the processor to:
generate a first message of a one-round key exchange protocol;
embed the first message into a beacon packet and broadcast the beacon packet such that a second wireless device receives the first message and responds by generating a response message based on the first message;
receive the response message from the second wireless device, wherein the response message comprises encrypted configuration data and a second message of the one-round key exchange protocol;
compute a shared key $K_S$ using the first message and the second message;
decrypt the encrypted configuration data using the shared key $K_S$; and
access the wireless network using the configuration data
wherein the one-round key exchange protocol comprises a Two-Basis Password Exponential Key Exchange (TBPEKE) protocol,
wherein the first message comprises a first token computed using a shared token $G_S$ and a random value x, the second message comprises a second token computed using the shared token $G_S$ and a random value y, and the shared key $K_S$ is computed using the shared token $G_S$ and the random values x and y, and
whereby the shared token is derived using two fixed points (U, V) on an Elliptic Curve Cryptography (ECC) and a random value w that were pre-loaded in the first and second wireless devices.

7. The first wireless device according to claim 6, wherein the response message further comprises a message authentication code (MAC) generated by the second wireless device,
wherein before the instructions direct the processor to decrypt the encrypted configuration data using the shared key $K_S$, the instructions direct the processor to:
verify the MAC using the computed shared key $K_S$; and
wherein decrypting the encrypted configuration data using the shared key $K_S$ comprises:
decrypting the encrypted configuration data using the shared key $K_S$ in response to verifying the MAC.

8. The first wireless device according to claim 6, wherein the first token is computed by multiplying the shared token $G_S$ with the random value x, the second token is computed by multiplying the shared token $G_S$ with the random value y, the shared key $K_S$ is computed by multiplying the shared token $G_S$ with the random values x and y, and the shared token $G_S$ is derived by:

$$G_S = U + w \cdot V.$$

9. The first wireless device according to claim 6,
wherein the one-round key exchange protocol comprises an Elliptic Curve Diffie-Hellman (ECDH) protocol,
wherein the first message comprises a first public key computed using a first private key and a finite cyclic group G, the second key comprises a second public key computed using a second private key and the finite cyclic group G, and the shared key $K_S$ is computed using the first private key, the second private key and the finite cyclic group G, and
whereby the finite cyclic group G is pre-loaded in the first and second wireless devices.

10. The first wireless device according to claim 9, wherein the first public key is computed by multiplying the first private key with the finite cyclic group G, the second public key is computed by multiplying the second private key with the finite cyclic group G, and the shared key KS is computed by multiplying the first private key with the second private key and the finite cyclic group G.

11. A non-transitory computer-readable medium storing instructions that, when executed by a processor in first wireless device, cause the processor to:
generate a first message of a one-round key exchange protocol;
embed the first message into a beacon packet and broadcast the beacon packet such that a second wireless device receives the first message and responds by generating a response message based on the first message;
receive the response message from the second wireless device, wherein the response message comprises encrypted configuration data and a second message of the one-round key exchange protocol;
compute a shared key $K_S$ using the first message and the second message;
decrypt the encrypted configuration data using the shared key $K_S$; and
access the wireless network using the configuration data
wherein the one-round key exchange protocol comprises a Two-Basis Password Exponential Key Exchange (TBPEKE) protocol,
wherein the first message comprises a first token computed using a shared token $G_S$ and a random value x, the second message comprises a second token computed using the shared token $G_S$ and a random value y, and the shared key $K_S$ is computed using the shared token $G_S$ and the random values x and y, and
whereby the shared token is derived using two fixed points (U, V) on an Elliptic Curve Cryptography (ECC) and a random value w that were pre-loaded in the first and second wireless devices.

12. The computer-readable medium according to claim 11, wherein the response message further comprises a message authentication code (MAC) generated by the second wireless device,
wherein before decrypting the encrypted configuration data using the shared key $K_S$, the instructions cause the processor to:

verify the MAC using the computed shared key $K_S$; and
wherein decrypting the encrypted configuration data using the shared key $K_S$ comprises:
    decrypting the encrypted configuration data using the shared key $K_S$ in response to verifying the MAC.

13. The computer-readable medium according to claim 11, wherein the first token is computed by multiplying the shared token $G_S$ with the random value x, the second token is computed by multiplying the shared token $G_S$ with the random value y, the shared key $K_S$ is computed by multiplying the shared token $G_S$ with the random values x and y, and the shared token $G_S$ is derived by:

$$G_S = U + w \cdot V.$$

14. The computer-readable medium according to claim 11,
wherein the one-round key exchange protocol comprises an Elliptic Curve Diffie-Hellman (ECDH) protocol,
wherein the first message comprises a first public key computed using a first private key and a finite cyclic group G, the second key comprises a second public key computed using a second private key and the finite cyclic group G, and the shared key $K_S$ is computed using the first private key, the second private key and the finite cyclic group G, and
whereby the finite cyclic group G is pre-loaded in the first and second wireless devices.

15. The computer-readable medium according to claim 14, wherein the first public key is computed by multiplying the first private key with the finite cyclic group G, the second public key is computed by multiplying the second private key with the finite cyclic group G, and the shared key KS is computed by multiplying the first private key with the second private key and the finite cyclic group G.

* * * * *